(12) United States Patent
Bae et al.

(10) Patent No.: US 8,081,838 B2
(45) Date of Patent: Dec. 20, 2011

(54) SYSTEM AND METHOD FOR PROVIDING TWO-SCALE TONE MANAGEMENT OF AN IMAGE

(75) Inventors: Soonmin Bae, Cambridge, MA (US); Fréderic Durand, Boston, MA (US); Sylvain Paris, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1000 days.

(21) Appl. No.: 11/725,095

(22) Filed: Mar. 16, 2007

(65) Prior Publication Data

US 2008/0226168 A1    Sep. 18, 2008

(51) Int. Cl.
*G06K 9/00* (2006.01)
*G06K 9/44* (2006.01)

(52) U.S. Cl. ......... 382/274; 382/171; 382/263; 345/582

(58) Field of Classification Search ................... 382/274, 382/171, 263; 345/582
See application file for complete search history.

(56) References Cited

U.S. PATENT DOCUMENTS

| | | | | |
|---|---|---|---|---|
| 5,872,867 | A * | 2/1999 | Bergen | 382/254 |
| 6,919,903 | B2 * | 7/2005 | Freeman et al. | 345/582 |
| 7,058,221 | B1 * | 6/2006 | Shikata | 382/169 |
| 7,146,059 | B1 * | 12/2006 | Durand et al. | 382/260 |
| 7,162,073 | B1 * | 1/2007 | Akgul et al. | 382/149 |
| 7,352,911 | B2 * | 4/2008 | Maurer | 382/260 |
| 7,492,375 | B2 * | 2/2009 | Toyama et al. | 345/629 |
| 2005/0013501 | A1 * | 1/2005 | Kang et al. | 382/254 |
| 2005/0243176 | A1 * | 11/2005 | Wu et al. | 348/207.1 |
| 2006/0008171 | A1 * | 1/2006 | Petschnigg et al. | 382/254 |
| 2006/0039690 | A1 * | 2/2006 | Steinberg et al. | 396/155 |

OTHER PUBLICATIONS

Jens Michael Carstensen, Description and Simulation of Visual Texture, 1992.*
Rolland et al. "Fast algorithms for histogram matching: Application to texture synthesis", Journal of electronic imaging, Jan. 2000.*
Rolland et al., "Aperture optimization for emission imaging: effect of a spatially varying background", J. Opt. Soc. Am., Jul. 1990.*
Rolland et al., "Synthesis of textured complex backgrounds", Society of Photo-optical Instrumentation engineers, Jul. 1998.*

* cited by examiner

*Primary Examiner* — Jason M Repko
*Assistant Examiner* — Patrick Edwards
(74) *Attorney, Agent, or Firm* — Sheehan, Phinney, Bass & Green, P.A.; Peter A. Nieves (57) ABSTRACT

The present invention provides two-scale tone management of an input image. A method of providing two-scale tone management contains the steps of: separating the input image into a base layer and a detail layer; separating a model image into a base layer and a detail layer; analyzing the input image globally for global contrast; analyzing the input image locally for local contrast; and performing detail preservation of the input image. A system contains a memory and a processor, where the processor is configured by the memory to perform the steps of: separating the input image into a base layer and a detail layer; separating a model image into a base layer and a detail layer; analyzing the input image globally for global contrast; analyzing the input image locally for local contrast; and performing detail preservation of the input image.

20 Claims, 4 Drawing Sheets

SYSTEM AND METHOD FOR PROVIDING TWO-SCALE TONE MANAGEMENT OF AN IMAGE

GOVERNMENT SUPPORT

The invention was supported, in whole or in part, by contract numbers CCF-0447561 and CCF-0429739 from National Science Foundation (NSF). The United States Government has certain rights in the invention.

FIELD OF THE INVENTION

The present invention is generally related to image enhancement, and more particularly is related to the two-scale tone management of a computer image.

BACKGROUND OF THE INVENTION

Much research has been dedicated to tone mapping for the display of high-dynamic-range images. These tools focus on contrast reduction, seeking a neutral reproduction, and are ideal when fidelity is needed. However, tone manipulation is also useful when an input has normal dynamic range, and many users seek to obtain a certain "look" for their pictures to convey a mood or an aesthetic. This is particularly significant for black-and-white photography where strikingly distinctive styles can be achieved.

The "look" of images has been addressed in Non-Photorealistic Rendering and recent analogy approaches enable the imitation of texture or stylized images in a purely data-driven fashion. However, present approaches do not enable the imitation of a photographic "look" such as the ones achieved by master black-and-white photographers.

A large part of such a look deals with the management of tones, which advanced photographers perform through elaborate lighting, tedious work in a darkroom, or using photo editing software. Unfortunately, such painstaking work and advanced skill is out of reach of casual users, although the casual user still has the desire to obtain such a look. In addition, issues of workflow and efficiency are becoming prevalent among professional users. The workflow describes the full process from image capture to printing and can include multiple software stages and manual retouching, all requiring much effort. Reducing the user work is critical to professionals, and many manuals and tools are dedicated to optimizing and automating all steps. For example, a wedding photographer takes hundreds of pictures and needs to give them a consistent look and to swiftly deliver them to clients. Individual retouching is hardly an option, and creative control over the look of each image is often sacrificed. Recently-introduced software such as Aperture, by Apple computer, Inc., of Cupertino, Calif., and Lightroom, by Adobe, of San Jose, Calif., focuses on workflow optimization but offers little interactive editing capabilities.

Thus, a heretofore unaddressed need exists in the industry to address the aforementioned deficiencies and inadequacies.

SUMMARY OF THE INVENTION

Embodiments of the present invention provide a system and method for providing two-scale tone management of an input image. Briefly described, in architecture, one embodiment of the system, among others, can be implemented as follows. The system contains a memory and a processor, where the processor is configured by the memory to perform the steps of: separating the input image into a base layer and a detail layer; separating a model image into a base layer and a detail layer; analyzing the input image globally for global contrast; and analyzing the input image locally for local contrast.

The present invention can also be viewed as providing methods for providing two-scale tone management of an input image. In this regard, one embodiment of such a method, among others, can be broadly summarized by the following steps: separating the input image into a base layer and a detail layer; separating a model image into a base layer and a detail layer; analyzing the input image globally for global contrast; analyzing the input image locally for local contrast; and performing detail preservation of said input image.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method provides two-scale tone management of images for purposes of transferring the look of a model image to an input image. The method is based on a two-scale, non-linear, decomposition of the input image. Different layers of the input image are modified based on their histograms and a technique is introduced for controlling spacial variation of detail. A correction is introduced, which prevents potential gradient reversal and preserved detail. This process and associated features are described in detail herein. It should be noted that while the present description uses the example of a photograph as the input image being manipulated, one having ordinary skill in the art would appreciate that the input image may instead be a computer created image.

The present system and method can be implemented in software (e.g., firmware), hardware, or a combination thereof. In the currently contemplated best mode, the system and method is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the present system and method is shown in FIG. 1.

Figure 1:
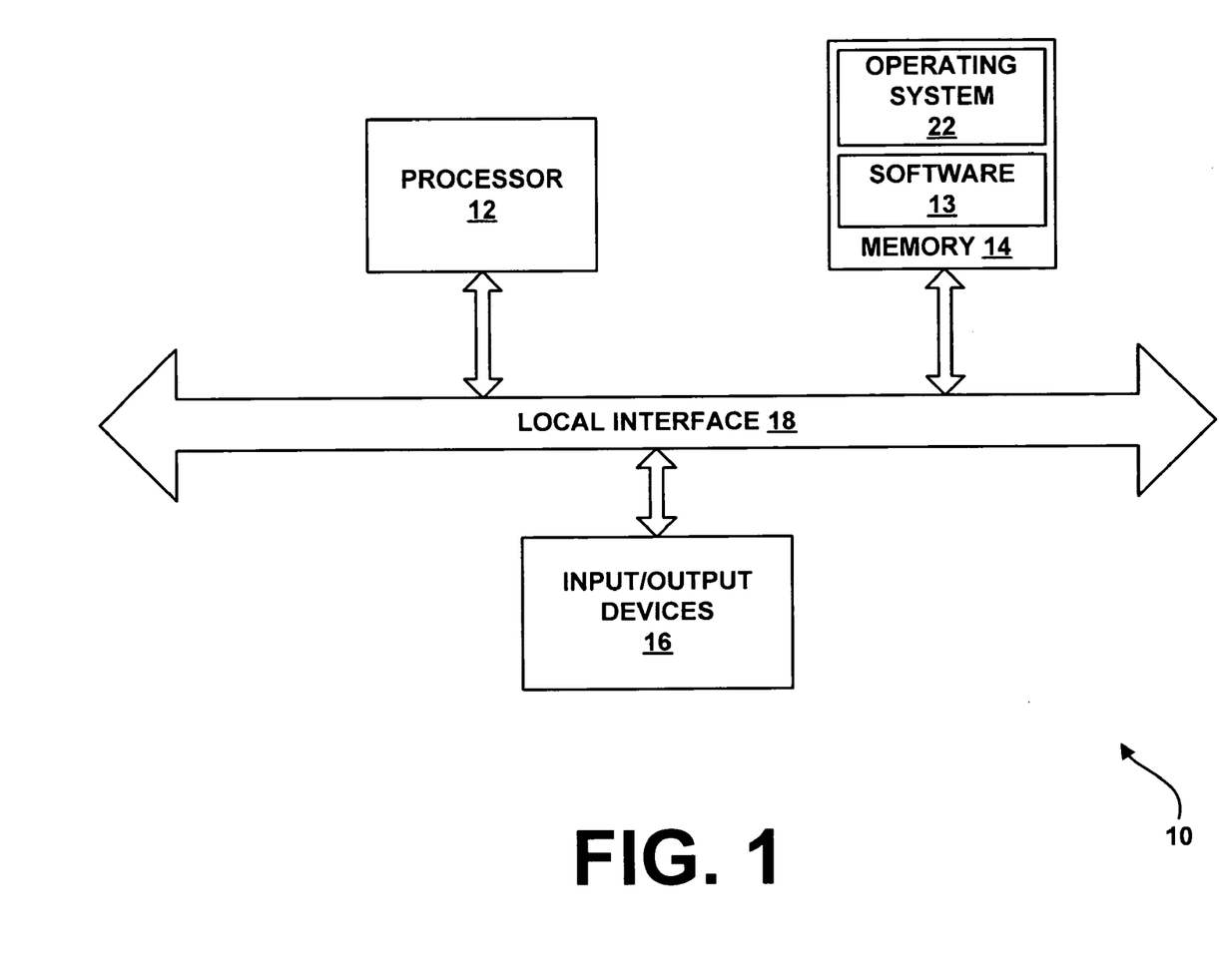
FIG. 1 is a schematic diagram of a general purpose computer that can be used to provide two-scale tone management.

Generally, in terms of hardware architecture, as shown in FIG. 1, the computer 10 includes a processor 12, a memory 14, and one or more input and/or output (I/O) devices 16 (or peripherals) that are communicatively coupled via a local interface 18. The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software 13, particularly that stored in memory 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software 13 in memory 14 may include one or more separate programs, each of which comprises an ordered listing of executable instructions for implementing logical functions in accordance with the present invention. Functionality defined by the software 13 is described in detail herein. In the example of FIG. 1, the memory 14 may also contain a suitable operating system (O/S) 22. The operating system 22 essentially controls the execution of other computer programs and provides scheduling, input-output control, file and data management, memory management, and communication control and related services.

The I/O devices 16 may include input devices, for example but not limited to, a keyboard, mouse, scanner, microphone, etc. Furthermore, the I/O devices 16 may also include output devices, for example but not limited to, a printer, display, etc. Finally, the I/O devices 16 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 10 is a personal computer, workstation, or the like, the memory 14 may further include a basic input output system (BIOS) (omitted for simplicity). The BIOS is a set of essential software routines that initialize and test hardware at startup, start the O/S 22, and support the transfer of data among the hardware devices. The BIOS is stored in ROM so that the BIOS can be executed when the computer 10 is activated.

When the computer 10 is in operation, the processor 12 is configured to execute the software 13 stored within the memory 14, to communicate data to and from the memory 14, and to generally control operations of the computer 10 pursuant to the software 13. When the present system and method is implemented in software, as is shown in FIG. 1, it should be noted that the software 13 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

In an alternative embodiment, where the system and method is implemented in hardware, the system and method can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
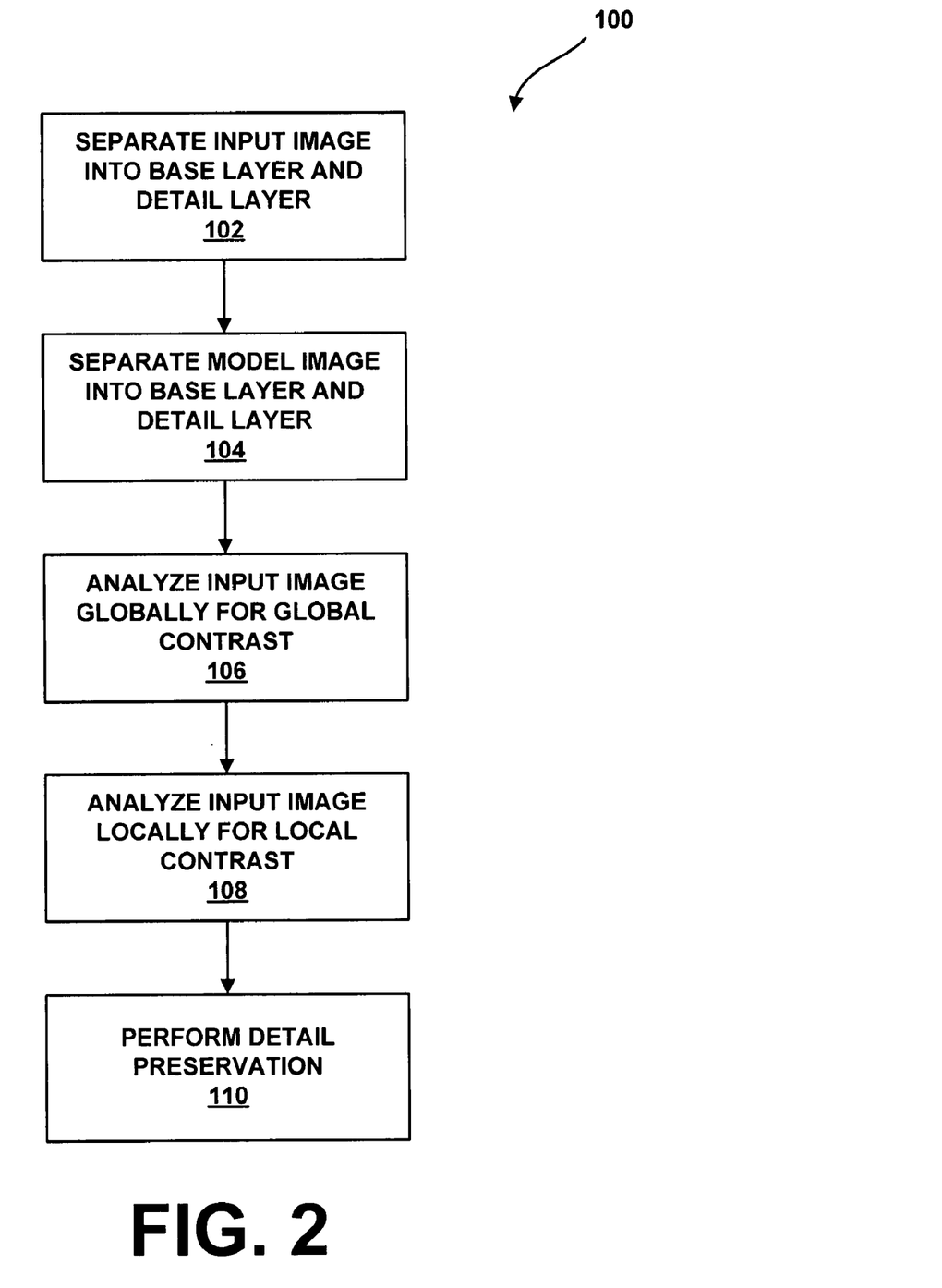
FIG. 2 is a flow chart further illustrating the two-scale tone management process performed by the computer of FIG. 1.

FIG. 2 is a flow chart 100 further illustrating the general process performed by the present two-scale tone management system and method. The process described herein is performed by the computer 10, as defined by the software 13 stored therein.

It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 102, an input image that is to be converted is separated into a base layer and a detail layer. Specifically, each pixel of the input image has a global contrast (i.e., the base layer) and a local contract (i.e., the detail layer), the superposition of which is the input image.

The base layer is obtained, for example, by using an edge-preserving bilateral filter. The bilateral filter is a non-linear filter, where the weight of each pixel is computed using a Gaussian in a spatial domain multiplied by an influence function in the intensity domain that decreases the weight of pixels with large intensity differences. The bilateral filtering is accelerated by using a piecewise-linear approximation in the intensity domain and appropriate subsampling.

The detail layer is the division of input image intensity by the base layer. A detailed description of separating an input image into a base layer and a detail layer is provided by the copending U.S. patent application Ser. No. 10/382,174, filed Mar. 3, 2003, and entitled, "A Method Of Performing Fast Bilateral Filtering and Using the Same for the Display of High-Dynamic-Range Images", which is hereby incorporated by reference in its entirety.

As is shown by block 104, to provide the capability of transferring the look of a model image to the input image, the model image that is to be used for impression is separated into a base layer and a detail layer. Separation of the model image into a base layer and a detail layer is performed by the same process mentioned above for separating the input image into a base layer and a detail layer. As a result, this process is not described again herein, but instead, reference should be made to the abovementioned process.

As is shown by block 106, the input image is then analyzed globally, for global contrast, thereby analyzing the base layer. To analyze the input image globally, for example, a histogram transfer of the base layer of the model image to the base layer of the input image is performed, also referred to herein as histogram matching. Specifically, each pixel intensity value of the base layer of the input image is changed so that a resulting histogram of the base layer of the input image is the same as a histogram of the base layer of the model image. This process provides a tonal balance. The base layer contains the large-scale spatial distribution of tones. In contrast to tone mapping where the base layer is just scaled down, a large-scale distribution of tones that matches the model image is enforced. This is why histogram matching is performed, specifically, to transfer the histogram of the model base layer onto a new base layer.

For example, given an input image I with histogram $h_I$ and a reference histogram $h_M$ (the histogram of the model image), we seek a function $l_I \triangleright_M$ such that applying $l_I \triangleright_M$ to each pixel of I results in an image with histogram $h_M$. To build $l_I \triangleright_M$, we use the cumulative histograms $c_M$ and $c_I$ defined by:

$$c(x) = \int_{-\infty}^{x} h. \quad \text{(eq. 1)}$$

It can be shown that $c_I(I)$ produces an image with a uniform histogram. Thus, we define:

$$l_I \triangleright_M(x) = c_M^{-1}[c_I(x)] \quad \text{(eq. 2)}$$

$l_I \triangleright_M(I)$ generates an image with the histogram $h_M$. Unfortunately, matching the pixel histogram alone may not be sufficient to control the tonal look of an image.

Figure 3:
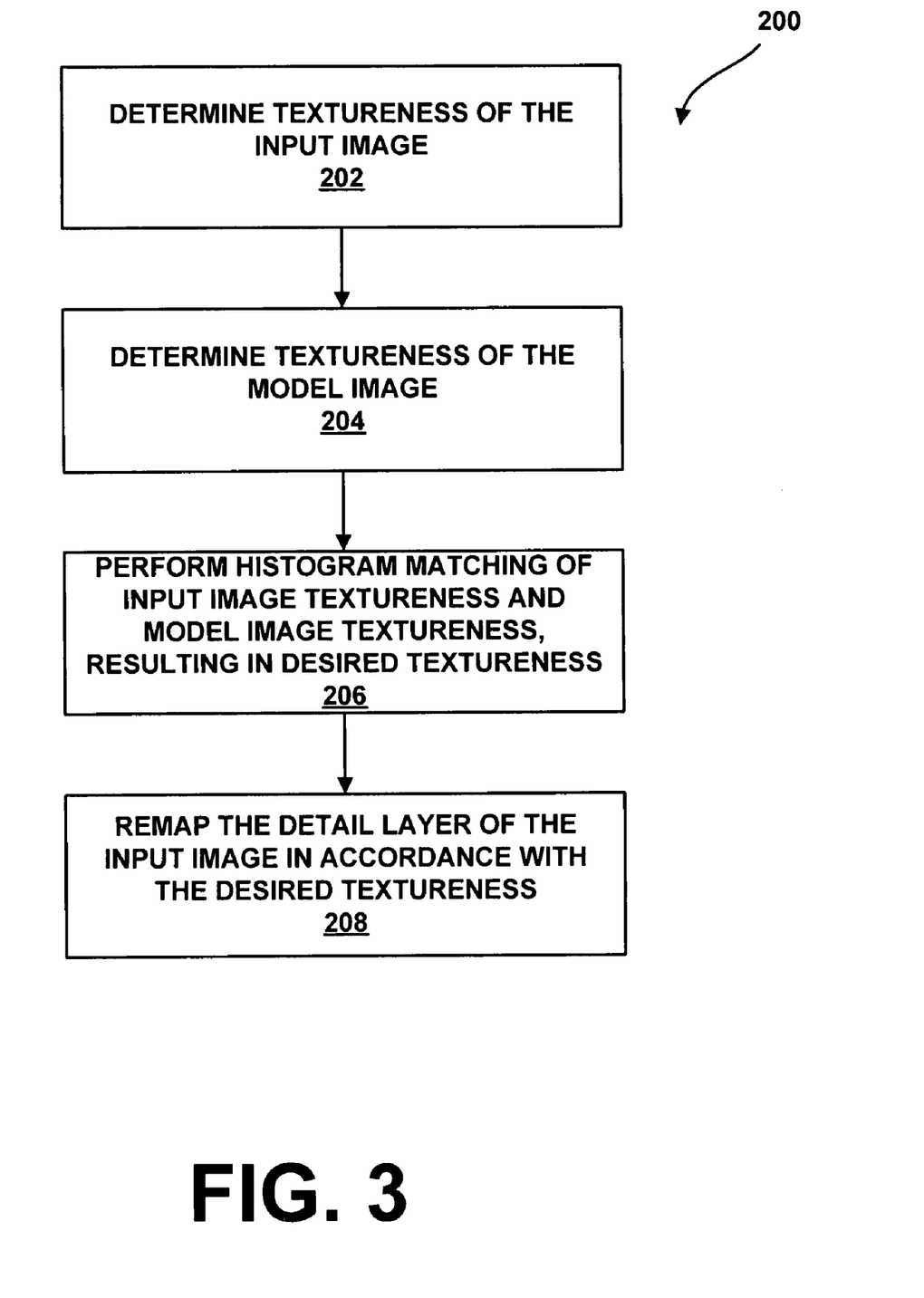
FIG. 3 is a flow chart further illustrating the step of locally analyzing an input image.

As is shown by block 108, the input image is then analyzed locally for local contrast. FIG. 3 is a flow chart 200 further illustrating the step of locally analyzing the input image. A description of FIG. 3 is provided hereinbelow.

FIG. 3 is a flow chart 200 further illustrating the step of locally analyzing the input image for local contrast, thereby analyzing the detail layer. As is shown by block 202, to analyze the input image locally, textureness of the input image is determined, where textureness is an amount of local contrast at each pixel based upon a surrounding region. In determining textureness, we seek to characterize the local amount of high-frequency content over the image to distinguish regions with high levels of detail from smooth regions.

To determine textureness of the input image, a high pass filtered version (H) of the input image is computed using a spatial scale ($\sigma_S$). It should be noted that the local average of such a high pass image is by definition zero: the low frequencies are removed. This is why the magnitude (or absolute value) of the high pass filtered version is considered. Determining the absolute value of the high pass filtered version results in determining the amplitude of the resulting high pass filtered component of the input image locally.

Unfortunately, such spatially-varying manipulation of detail can lead to artifacts at a boundary between highly detailed and smooth regions. This is because the amount of detail on one side of the boundary influences the estimate on the other side, and the manipulation suffers from a halo effect similar to that observed in linear frequency decomposition of image intensity. This problem is the same as the one addressed by edge preserving decomposition, except that we are dealing with a less spatially localized quantity, namely, the magnitude of high-frequency |H|. Due to strong edges being hard to characterize in |H|, in accordance with the present invention, textureness is defined as using a cross-bilateral filter, where intensity image defines the edge preserving term to filter |H|.

Textureness of the input image is defined as:

$$T(I)_p = \frac{1}{k} \sum_{q \in |H|} g\sigma_s(\|p-q\|)g\sigma_r(|I_p - I_q|)|H|_q \quad \text{(eq. 3)}$$

with:

$$k = \sum_{q \in I} g\sigma_s(\|p-q\|)g\sigma_r(|I_p - I_q|) \quad \text{(eq. 4)}$$

Equations three and four provide an analysis of the amount of local texture, which is performed by: determining high-frequency content of the input image; applying a high pass filter, which removes the global component; determining the amplitude of the resulting high pass component of the input image locally by taking an absolute value of the high pass version of the image; and then determining the amplitude of the surroundings of pixels of the local input image, thereby performing local average or low pass filtering. During performing of the local average, averaging high frequency amplitudes of pixels surrounding the input image is performed. Thereafter, a contribution of each pixel of the input image is weighted to the local average according to a value of the pixel in the input image.

As is shown by block 204, textureness of the model image is then determined. Textureness of the model image (T(M)) may be determined by using the same equations as those used for determining textureness of the input image, but using model image data.

As is shown by block 206, histogram matching of the model image textureness to textureness of the input image is then performed to derive a desired textureness. To provide histogram matching a histogram transfer is performed. Specifically, the input image (I) and the model image (M) have textureness maps T(I) and T(M), respectively, as shown herein. Using a histogram transfer, the histogram of the model image textureness map T(M) is enforced onto the histogram of the input image textureness map T(I), resulting in the desired textureness map T'.

The detail layer of the input image is then modified to achieve the desired textureness, which is also referred to herein as remapping the detail layer of the input image (block 208). To remap the detail layer of the input image in accordance with the desired textureness, each pixel within the detail layer of the input image is modified by multiplying its value by an amount (i.e., ratio ρ), where the amount is dependant upon a ratio between the existing textureness of the input image T(I) and the desired textureness (T'). Specifically, for reasons such as, but not limited to, preventing halos, the detail layer D of the input image is modified to approximate the desired textureness map T'. The textureness values of the detail layer D, per pixel, are scaled by a ratio ρ to match desired textureness map T' values, while accounting for textureness of the base B', modified by tonal balance. The ratio ρ is determined by using the equation:

$$\rho_p = \max\left(0, \frac{T'_p - T(B')_p}{T(D)_p}\right) \quad \text{(eq. 5)}$$

It should be noted that it is beneficial not to apply negative ratios, thereby preventing gradient reversals.

The layers are then linearly recombined to produce the output (i.e., the remapped input image):

$$O = B' + \rho D \quad \text{(eq. 6)}$$

The remapped detail layer of the input image is the resulting input image having the look of the model image.

Figure 4:
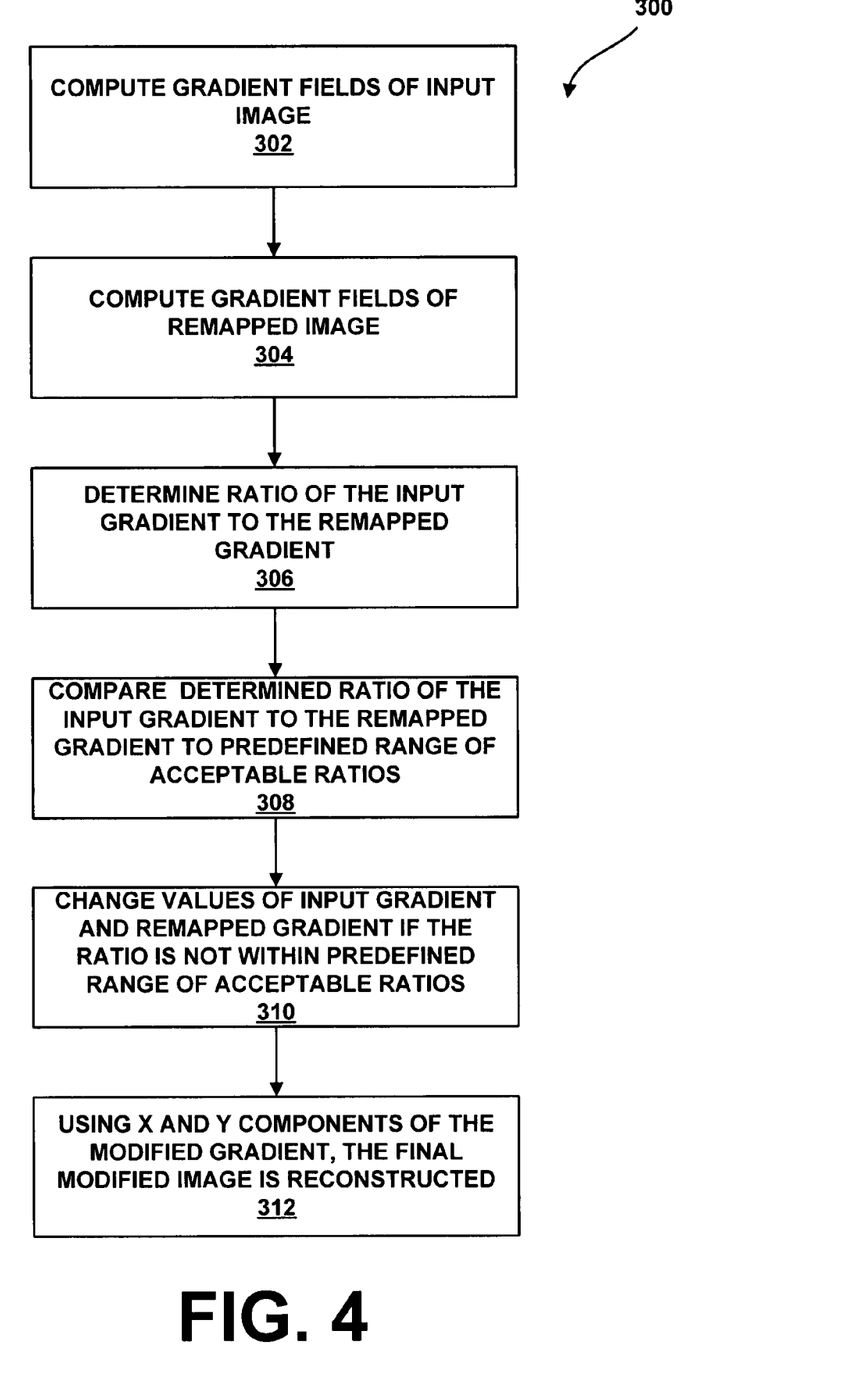
FIG. 4 is a flow chart further illustrating the step of performing detail preservation.

Referring back to FIG. 2, detail preservation may optionally be performed (block 110). Specifically, after having performed manipulation of the input image, it is possible that either too much manipulation of the input image has taken place, or that errors have been performed in manipulation of the input image. FIG. 4 is a flow chart 300 further illustrating the step of performing detail preservation to correct for too much manipulation or errors.

Referring now to FIG. 4, gradient fields of the input image are computed for each pixel of the input image (block 302), resulting in an input gradient. The input gradient is represented by the first-order partial derivatives of the input image: $\partial I/\partial x$ and $\partial I/\partial y$. These derivatives can be computed for instance using forward differences:

$$\partial I/\partial x(x,y) = I(x+1,y) - I(x,y) \quad \text{(eq. 7)}$$

$$\partial I/\partial y(x,y) = I(x,y+1) - I(x,y) \quad \text{(eq. 8)}$$

It should be noted that other techniques can be used to compute derivatives.

As is shown by block 304, gradient fields of the remapped image are computed for each pixel of the remapped image, resulting in a remapped gradient. The remapped gradient is represented by the first-order partial derivatives of the remapped image: $\partial O/\partial x$ and $\partial O/\partial y$. These derivatives can be computed for instance using forward differences:

$$\partial O/\partial x(x,y) = O(x+1,y) - O(x,y) \quad \text{(eq. 9)}$$

$$\partial O/\partial y(x,y) = O(x,y+1) - O(x,y) \quad \text{(eq. 10)}$$

It should be noted that other techniques can be used to compute derivatives.

To ensure that gradient fields between the input image and the remapped image are not too large or too small, a ratio of the input gradient to the remapped gradient is first determined (block 306). The ratio is then compared to a predefined range of acceptable ratios of the input gradient to the remapped gradient (block 308). This acceptable ratio ranges from a low ratio ($\alpha$) to a high ratio ($\beta$).

Values of the input gradient and remapped gradient are then changed if the ratio of the input gradient to the remapped gradient is not within the predefined range of acceptable ratios (block 310), resulting in x and y components of a modified gradient. Specifically, if the ratio of the input gradient to the remapped gradient is too low, values of the input gradient and remapped gradient are changed so that the ratio is increased to at least the predefined low ratio ($\alpha$). Alternatively, if the ratio of the input gradient to the remapped gradient is too high, values of the input gradient and remapped gradient are changed so that the ratio is decreased to at least the predefined high ratio ($\beta$). Further, if the ratio of the input gradient to the remapped gradient is within the acceptable range of ratios, values of the input gradient are kept the same.

Modification of the gradient values to result in an acceptable ratio of the input gradient to the remapped gradient is performed by: using equation eleven (eq. 11), equation twelve (eq. 12), or equation thirteen (eq. 13), each of which are listed below, to determine an x component of a modified gradient ($x_v$); and using equation fourteen (eq. 14), equation fifteen (eq. 15), or equation sixteen (eq. 16), each of which are listed below, to determine a y component of a modified gradient ($y_v$).

$$\alpha \partial I/\partial x \text{ if } |\partial O/\partial x| < \alpha |\partial I/\partial x| \quad \text{(eq. 11)}$$

$$\beta \partial I/\partial x \text{ if } |\partial O/\partial x| > \beta |\partial I/\partial x| \quad \text{(eq. 12)}$$

$$\partial O/\partial x \text{ otherwise} \quad \text{(eq. 13)}$$

$$\alpha \partial I/\partial y \text{ if } |\partial O/\partial y| < \alpha |\partial I/\partial y| \quad \text{(eq. 14)}$$

$$\beta \partial I/\partial y \text{ if } |\partial O/\partial y| > \beta |\partial I/\partial y| \quad \text{(eq. 15)}$$

$$\partial O/\partial y \text{ otherwise} \quad \text{(eq. 16)}$$

In the abovementioned equations eleven through sixteen (eq. 11-eq. 16), $\partial I$ is the gradient of the input image and $\partial O$ is the gradient of the remapped image.

Referring to equation eleven (eq. 11) and equation fourteen (e.q., 14), if the absolute value of the remapped image gradient is less than $\alpha$ multiplied by the absolute value of the input image gradient, the x component of the modified gradient is equal to a multiplied by the input image gradient in the x domain, and the y component of the modified gradient is equal to a multiplied by the input image gradient in the y domain.

Referring to equation twelve (eq. 12) and equation fifteen (eq. 15), if the absolute value of the remapped image gradient is greater than $\beta$ multiplied by the absolute value of the input image gradient, the x component of the modified gradient is equal to $\beta$ multiplied by the input image gradient in the x domain, and the y component of the modified gradient is equal to $\beta$ multiplied by the input image gradient in the y domain.

Alternatively, as is shown by equations thirteen (eq. 13) and sixteen (eq. 16), the x component of the modified gradient is the gradient of the remapped image in the x domain, and the y component of the modified gradient is the gradient of the remapped image in the y domain.

Having the x and y components of the modified gradient, the final modified input image is reconstructed (block 312). As an example, the reconstruction can be performed by solving the Poisson equation where the modified image O is the unknown. The Poisson equation is as follows:

$$\partial O/\partial t = \delta O - div(\partial O/\partial x, \partial O/\partial y) \quad \text{(eq. 17)}$$

Equation seventeen defines an evolution process that reconstructs the image O from the modified gradient ($\partial O/\partial x$, $\partial O/\partial y$). The variable t represents the evolution of pseudo-time. It should be noted that the modified image O can be reconstructed from its gradient using a variety of other techniques.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of providing two-scale tone management of an input image, comprising the steps of:

separating said input image into a base layer that characterizes large-scale spatial distribution of tones, and a detail layer that captures local contrast at each pixel based on a surrounding region;

separating a model image into a base layer that characterizes large-scale spatial distribution of tones, and a detail layer that captures local contrast at each pixel based on a surrounding region;

analyzing and transferring global contrast from said model image into said input image; and analyzing and transferring local contrast from said model image into said input image,
wherein said step of analyzing and transferring local contrast further comprises the steps of:
determining textureness of said input image; determining textureness of said model image;
performing histogram matching of said determined textureness of said input image and said determined textureness of said model image, resulting in a desired textureness; and
remapping said detail layer of said input image in accordance with said desired textureness,
wherein said step of determining textureness of said model image further comprises the steps of:
applying a high pass filter to remove a global component of said model image, resulting in a high pass component of said model image;
determining an amplitude of said high pass component of said model image; and
averaging high frequency amplitudes of pixels surrounding a given pixel in said model image,
wherein said step of determining textureness of said model image further comprises the steps of:
determining textureness of said input image base layer modified by a global contrast adjustment;
determining textureness of said input image detail layer;
subtracting said textureness of said input image base layer modified by said global contrast adjustment from said desired textureness, resulting in a textureness difference;
dividing said textureness difference by said textureness of said input image detail layer to provide a ratio; and
multiplying textureness values, per pixel, of said input image detail layer by said ratio.

2. The method of claim 1, wherein said step of analyzing and transferring global contrast further comprises the step of performing a histogram transfer of said base layer of said model image to said base layer of said input image.

3. The method of claim 1, wherein said step of performing histogram matching further comprises the step of enforcing a histogram of said model image textureness onto a histogram of said input image textureness, resulting in said desired textureness.

4. The method of claim 1, wherein said step of determining textureness of said input image further comprises the steps of:
applying a high pass filter to remove a global component of said input image, resulting in a high pass component of said input image;
determining an amplitude of said high pass component of said input image; and
averaging high frequency amplitudes of pixels surrounding given pixel in said input image.

5. The method of claim 4, further comprising the step of weighting a contribution of each pixel of said input image to said average according to a value of said pixel in said input image.

6. The method of claim 1, further comprising the step of weighting a contribution of each pixel of said model image to said average according to a value of said pixel in said model image.

7. The method of claim 1, wherein said step of remapping said detail layer of said input image in accordance with said desired textureness further comprises the step of modifying each pixel within said detail layer of said input image by multiplying a value of said pixel intensity by an amount, wherein said amount is dependant upon a ratio between existing textures of said input image and said desired textureness.

8. A system for providing two scale tone management of an input image, comprising:
logic implemented via hardware logic circuitry configured to separate said input image into a base layer that characterizes large-scale spatial distribution of tones, and a detail layer that captures local contrast at each pixel based on a surrounding region;
logic implemented via hardware logic circuitry configured to separate a model image into a base layer that characterizes large-scale spatial distribution of tones, and a detail layer that captures local contrast at each pixel based on a surrounding region;
logic implemented via hardware logic circuitry configured to analyze and transfer global contrast from said model image into said input image said input image globally for global contrast; and
logic implemented via hardware logic circuitry configured to analyze and transfer local contrast from said model image into said input image,
logic implemented via hardware logic circuitry configured to determine textureness of said input image;
logic implemented via hardware logic circuitry configured to determine textureness of said model image;
logic implemented via hardware logic circuitry configured to perform histogram matching of said determined textureness of said input image and said determined textureness of said model image, resulting in a desired textureness; and
logic implemented via hardware logic circuitry configured to remap said detail layer of said input image in accordance with said desired textureness;
logic implemented via hardware logic circuitry configured to apply a high pass filter to remove a global component of said input image, resulting in a high pass component of said input image;
logic implemented via hardware logic circuitry configured to determine an amplitude of said high pass component of said input image; and
logic implemented via hardware logic circuitry configured to average high frequency amplitudes of pixels surrounding a given pixel in said input image;
logic implemented via hardware logic circuitry configured to determine textureness of said input image base layer modified by a global contrast adjustment;
logic implemented via hardware logic circuitry configured to determine textureness of said input image detail layer;
logic implemented via hardware logic circuitry configured to subtract said textureness of said input image base layer modified by said global contrast adjustment from said desired textureness, resulting in a textureness difference;
logic implemented via hardware logic circuitry configured to divide said textureness difference by said textureness of said input image detail layer to provide a ratio; and
logic implemented via hardware logic circuitry configured to multiply textureness values, per pixel, of said input image detail layer by said ratio.

9. The system of claim 8, wherein said logic configured to analyze and transfer global contrast further performs the step of performing a histogram transfer of said base layer of said model image to said base layer of said input image.

10. The system of claim 8, further comprising logic implemented via hardware logic circuitry configured to enforce a histogram of said model image textureness onto a histogram of said input image textureness, resulting in said desired textureness.

11. The system of claim 8, further comprising logic implemented via hardware logic circuitry configured to weight a contribution of each pixel of said input image to said average according to a value of said pixel in said input image.

12. The system of claim 8, further comprising:
logic implemented via hardware logic circuitry configured to apply a high pass filter to remove a global component of said model image, resulting in a high pass component of said model image;
logic implemented via hardware logic circuitry configured to determine an amplitude of said high pass component of said model image; and
logic implemented via hardware logic circuitry configured to average high frequency amplitudes of pixels surrounding given pixel in said model image.

13. The system of claim 12, further comprising logic implemented via hardware logic circuitry configured to weight a contribution of each pixel of said model image to said average according to a value of said pixel in said model image.

14. A system for providing two scale tone management of an input image, comprising: a memory; a processor configured by said memory to perform the steps of:
separating said input image into a base layer that characterizes large-scale spatial distribution of tones, and a detail layer that captures local contrast at each pixel based on a surrounding region;
separating a model image into a base layer that characterizes large-scale spatial distribution of tones, and a detail layer that captures local contrast at each pixel based on a surrounding region;
analyzing and transferring global contrast from said model image into said input image; and
analyzing and transferring local contrast from said model image into said input, wherein said step of analyzing and transferring local contrast further comprises the steps of:
determining textureness of said input image;
determining textureness of said model image;
performing histogram matching of said determined textureness of said input image and said determined textureness of said model image, resulting in a desired textureness; and
remapping said detail layer of said input image in accordance with said desired textureness,
wherein said step of determining textureness of said model image further comprises the steps of:
applying a high pass filter to remove a global component of said model image, resulting in a high pass component of said model image;
determining an amplitude of said high pass component of said model image; and
averaging high frequency amplitudes of pixels surrounding a given pixel in said model image,
wherein said step of determining textureness of said model image further comprises the steps of:
determining textureness of said input image base layer modified by a global contrast adjustment;
determining textureness of said input image detail layer;
subtracting said textureness of said input image base layer modified by said global contrast adjustment from said desired textureness, resulting in a textureness difference;
dividing said textureness difference by said textureness of said input image detail layer to provide a ratio; and
multiplying textureness values, per pixel, of said input image detail layer by said ratio.

15. The system of claim 14, wherein said step of analyzing and transferring global contrast further comprises the step of performing a histogram transfer of said base layer of said model image to said base layer of said input image.

16. The system of claim 14, wherein said step of performing histogram matching further comprises the step of enforcing a histogram of said model image textureness onto a histogram of said input image textureness, resulting in said desired textureness.

17. The system of claim 14, wherein said step of determining textureness of said input image further comprises the steps of:
applying a high pass filter to remove a global component of said input image, resulting in a high pass component of said input image;
determining an amplitude of said high pass component of said input image; and
averaging high frequency amplitudes of pixels surrounding a given pixel in said input image.

18. The system of claim 17, further comprising the step of weighting a contribution of each pixel of said input image to said average according to a value of said pixel in said input image.

19. The system of claim 14, further comprising the step of weighting a contribution of each pixel of said model image to said average according to a value of said pixel in said model image.

20. The system of claim 14, wherein said step of remapping said detail layer of said input image in accordance with said desired textureness further comprises the step of modifying each pixel within said detail layer of said input image by multiplying a value of said pixel intensity by an amount, wherein said amount is dependant upon a ratio between existing textures of said input image and said desired textureness.

* * * * *